March 23, 1965   E. T. NORD ETAL   3,175,075
PAINT HEATER
Original Filed Jan. 14, 1960   4 Sheets-Sheet 1
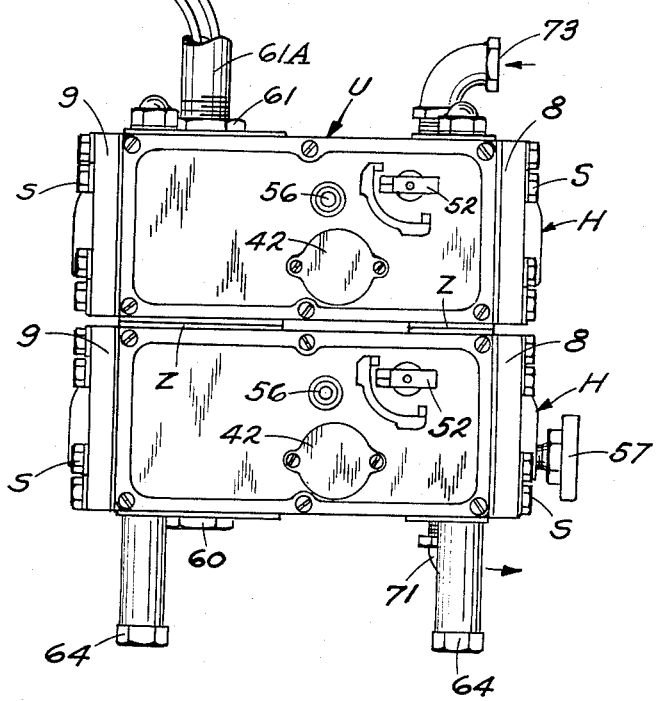
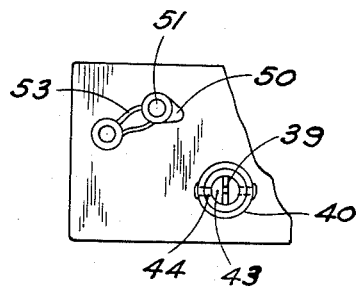
INVENTORS
ERIC T. NORD &
SAMUEL R. ROSEN.
BY
ATTORNEYS March 23, 1965 E. T. NORD ETAL 3,175,075
PAINT HEATER Original Filed Jan. 14, 1960 4 Sheets-Sheet 2

INVENTORS
ERIC T. NORD &
SAMUEL R. ROSEN.
BY
ATTORNEYS

March 23, 1965 E. T. NORD ETAL 3,175,075
PAINT HEATER
Original Filed Jan. 14, 1960 4 Sheets-Sheet 3
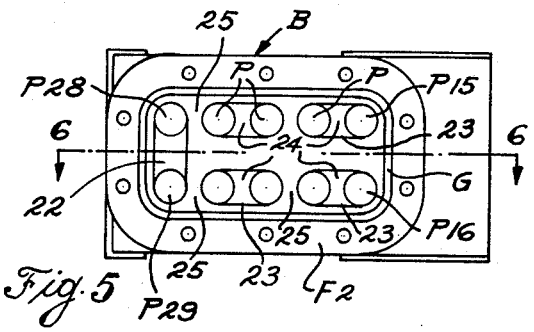
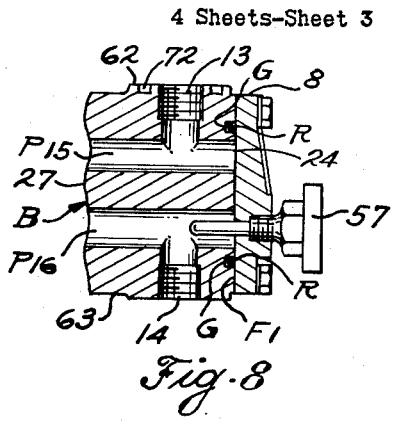
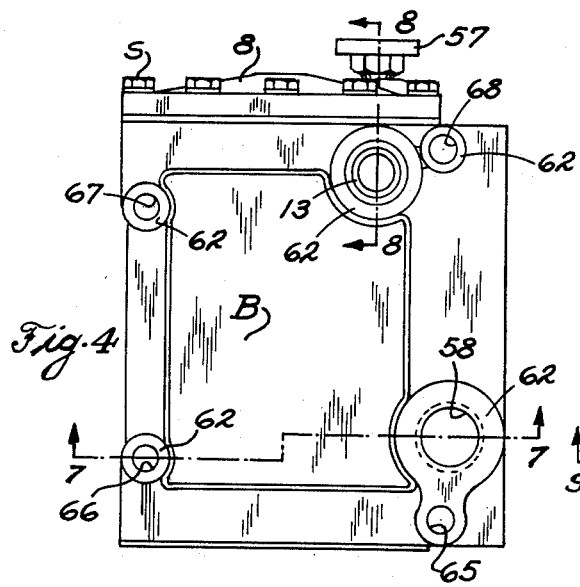
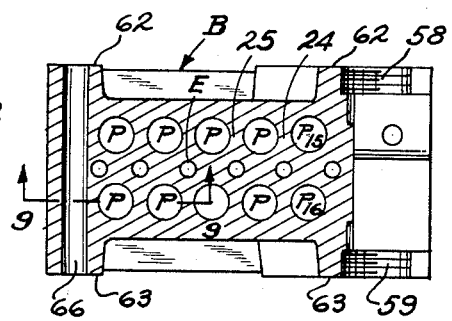
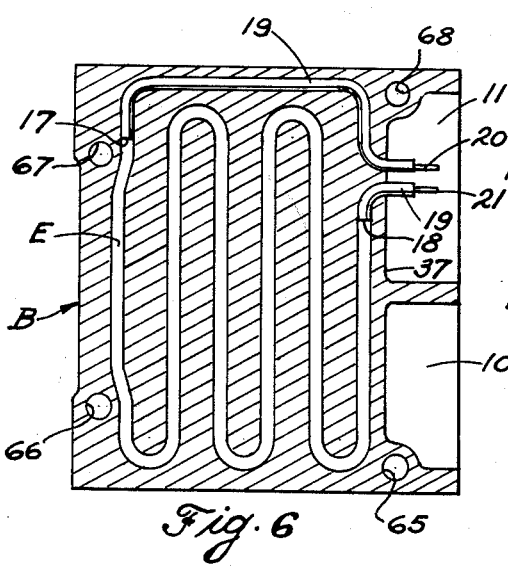
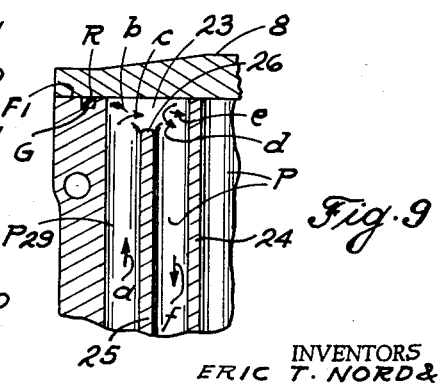
INVENTORS
ERIC T. NORD &
SAMUEL R. ROSEN.
BY
ATTORNEYS March 23, 1965 E. T. NORD ETAL 3,175,075
PAINT HEATER
Original Filed Jan. 14, 1960 4 Sheets-Sheet 4
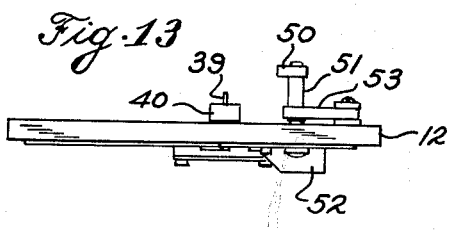
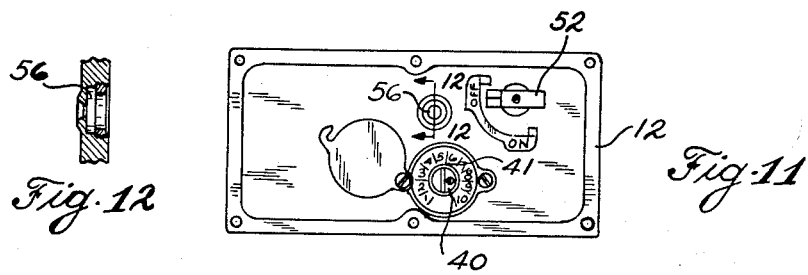
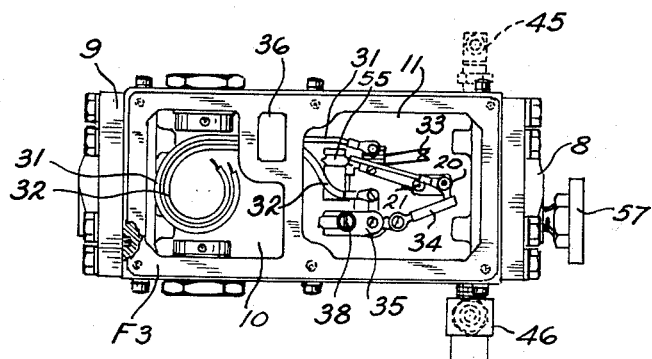
INVENTORS
ERIC T. NORD &
SAMUEL R. ROSEN.
BY
ATTORNEYS

United States Patent Office 3,175,075
Patented Mar. 23, 1965

3,175,075
PAINT HEATER
Eric T. Nord, Oberlin, and Samuel R. Rosen, Lorain, Ohio, assignors to Nordson Corporation, Amherst, Ohio, a corporation of Ohio
Continuation of abandoned application Ser. No. 2,458, Jan. 14, 1960. This application Jan. 28, 1963, Ser. No. 254,834
18 Claims. (Cl. 219—298)

This invention relates to paint heaters and to means for heating fluids, and more particularly, to a unitary, multiple, or potentially multiple, element heater for heating paint under pressure. Our invention is, among other things, an improvement upon the paint heater patented in U.S. Patent No. 2,576,558 of November 27, 1951. This application is a continuation of our prior application, Serial No. 2,458 filed January 14, 1960 and abandoned in favor of this application.

While our invention has utility in the broad aspect of heating fluids generally and/or heating fluids under high pressure, our invention is directed particularly to solving the problems incident to and associated with the heating of paint in aid of its being applied by spraying, and, particularly when the spraying is done by the Airless Method, U.S. Patent No. 2,754,228. For convenience, we shall use the word paint in its present comprehensive and conventional meaning in this art to comprehend all or most all coating and finishing materials and otherwise, including enamels, emulsions, catalyzed resins, mastics and asphaltums, waxes and paraffins, oils and lubricants, lacquers, plastisols, adhesives and other specialty coatings.

Prior to our invention, paint heaters, including those patented in the above mentioned Patent No. 2,576,558, had shortcomings including; difficulty of inspecting and cleaning the paint passages, relative inaccessability of the working parts, controls and adjustments, the presence of traps and pockets in the path of flow of the fluid to be heated with other invitations to the separation of constituents intended to be entrained in the liquid part of the paint, and no means or provision to avoid local overheating due to stratification nor to re-entrain paint constituents which became de-entrained in the heater, nor to mix or remix hot and cold constituents sufficiently. The prior art also made no practicable provision for the quick and efficient modification or change in the capacity of paint heaters other than by the mere aggregation of heating devices with aggravation of the troubles peculiar thereto.

It is among the objects of our invention to solve the problems which have plagued the prior art, including those stated and discussed above.

An object of our invention is to provide in a paint heater the facility of changing the capacity thereof as by the easy assembly and disassembly of independently operable and controllable primary heating elements. A more specific object is to provide a multiple element unitary paint heater achieved by the simple, detachable stacking of a plurality of independent paint heating elements wherein beneficient coaction between the elements, hydraulically, electrically and mechanically is largely achieved by the combining of the elements one atop another and the bolting and clamping of the same together.

Another object is to provide a paint heater which in the form of a primary heating element, or in the form of a unitary heater comprising a plurality of such heating elements, will permit the handy inspection and cleaning of the internal paint passages without separating the elements from each other and without interfering with the electrical connections or controlling mechanisms. It is also among our objects to provide paint heating elements and/or coacting combinations thereof in which the fluid passages provide a continuous down-hill, or not-up-hill, path of flow devoid of pockets, traps, hot spots and other invitations to deleterious separation of paint constituents, sedimentation, agglomeration or other deleterious phenomena incident to inaccessable and/or curved and/or wrongwardly shaped or inclined passages.

A further object is to provide for the remixing of the paint in its flow through the heater and the maintenance of the homogeneity and uniform temperature of the constituents thereof and/or the re-entrainment of constituents which may have or tend to have separated from or settled out of the paint in the heater.

Another object of our invention is to provide uniform heating of the paint in our heater with the lowest possible temperature differential between the desired output temperature of the paint and the temperature of the heat transfer surfaces from which the paint receives its heat.

Another object is to provide explosion proof compartments for electrical switches and opening and closing electrical contacts and for junction boxes for the electrical leads of our paint heaters, and to provide a continuous explosion proof junction box for a plurality of primary heating elements when and as the same are integrated with others in multiple unitary form. Another object is to provide externally accessible controls for opening, closing and adjusting the electrical circuits and effects, all from without the explosion proof chambers without impairing the explosion proof qualities of the heater.

Another object is to provide a heater for paint or other fluid so constructed that its essential heat transmitting body, comprising, inter alia, the fluid passages for the fluid to be heated, may be made conveniently and economically by the process of die casting. A further object is to provide convenient visual indications of the state of operation and condition of being of a paint heater. Another object is to provide a paint heater capable of withstanding high fluid pressures as of the order of several thousand pounds per square inch and capable of heating paints or other fluids efficiently and economically up to temperatures as high as several hundred degrees Fahrenheit.

Other objects and advantages of our invention will appear more fully from the following description of a preferred form thereof, reference being made to the accompanying drawings in which:

FIGURE 1 is a front elevation of a multiple element, unitary heater embodying our invention and comprising, specifically, a pair of primary heater elements connected together for unitary operation.

FIGURE 4 is a top plan view of the body part of one of our primary heater elements having, however, an end cover plate carrying a thermometer; the cover plate being attached to the end of the body where paint enters and is discharged. For convenience, this will be called the "in and out," or near end of the body.

FIGURE 5 is an end elevation of the opposite end of the body, conveniently called the "return" or far end of the body of the heater element.

FIGURE 6 is a horizontal section of the body of our heater element taken in the plane of the line 6—6 of FIGURE 5.

FIGURE 7 is a vertical, sectional view taken in the broken plane of the line 7—7 of FIGURE 4.

FIGURE 8 is a fragmentary, vertical, sectional view taken in the plane of the line 8—8 of FIGURE 4.

FIGURE 9 is a fragmentary, horizontal, sectional view taken in the plane of the line 9—9 in FIGURE 7 at the far end of the heating element.

FIGURE 10 is a front elevation of one of the heater elements of our invention with, however, the front cover plate removed and showing electrical apparatus and explosion proof chambers therefor.

FIGURE 11 is a front elevation of the front closure and control plate for the explosion proof chambers of the front end of one of our heater elements.

FIGURE 12 is a fragmentary sectional view taken in the plane of the line A—A of FIGURE 11.

FIGURE 13 is a top view of the closure and control plate of FIGURE 11, and

FIGURE 14 is a rear elevation of a part of the control plate of FIGURE 13 showing the inward ends of the manually operated control devices.

Figure 2:
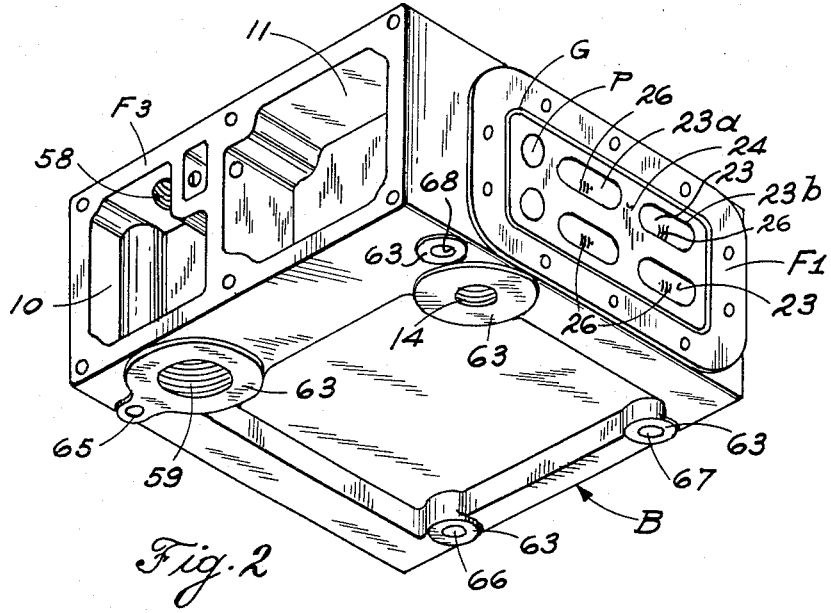
FIGURE 2 is an isometric view from the bottom looking up at the main body of one of the heater elements embodying our invention.

Each primary heating element H of our invention, FIG. 1, comprises the preferably die cast, metal heat exchanging and heat transmitting body B, FIGS. 2–8, having an electrical resistance heating coil E cast in the middle interior and central plane thereof, FIGS. 6 and 7, and having straight, unobstructed fluid conducting passages P formed therein proximate the heating coil, FIG. 7. The passages P are preferably arranged in pairs and in parallelism to the coil E and to each other, FIGS. 2, 3, 5, 7 and 9, and extend all the way through the body from end to end, and are open and accessible for cleaning at both ends in the absence of removable end closure plates 8 and 9, FIGS. 1, 4, 8, and 9. Each heating element also comprising said plates; the "near" plate 8 for the "in and out" end of the body seen in FIGS. 2 and 3, and the "far" plate 9 for the "return" end of the body as seen in FIG. 5. The body B of each primary element also comprises explosion proof chambers 10 and 11, FIGS. 2 and 3, at the front of the element as viewed in FIGS. 1 and 10, the chamber 10 serving as a junction box for the interior and exterior power lines and the chamber 11 housing manually and thermostatically actuated switches, see FIG. 10; both chambers being closed by the control carrying front closure plate 12, FIGS. 1, 11–14. Each primary heating element also comprises a paint inlet port 13 and outlet port 14, FIGS. 2, 3 and 9, communicating respectively with particular terminal passages P15 and P16 of the passages P. As will more fully appear below, each primary heating element has appropriate electrical and other means to be a self-sufficient, separately controlled and independently operable paint heater on the one hand and, on the other hand, is formed and constructed to have facility for being operatively associated and combined with like primary heating elements to form and comprise a multiple element, unitary heater, functioning as a simple, single integrated instrumentality, such as the multiple element, unit heater U comprising a pair of coacting primary elements H as shown in FIG. 1.

As presently advised, aluminum has been found to be a suitable and exemplary metal from which the body B may be made, preferably by die casting. We do not exclude other metals, alloys or materials having the qualities found to be desirable for performing the functions we ascribe to the body and the making thereof, including: (1) facility for being readily cast into a homogenous uniform mass and easily worked and machined, (2) structural strength for stacking, joining and withstanding high fluid pressures, such as up to about 5000 pounds per square inch test pressure and about 1000 pounds per square inch working pressure, (3) thermal stability wherewith to preserve its operative form and condition from room temperature up to several hundred degrees Fahrenheit, (4) high thermal conductivity and low surface heat transfer resistance whereby to distribute, transmit and diffuse heat from coil E to the fluid in the passages P efficiently, freely and uniformly, and withal a modest cost. Copper, silver, magnesium and their various alloys suggest and distinguish themselves as relatively desirable compared with aluminum for some or all the attributes that we prefer, and/or for the lack of certain thereof. We prefer that the closure plates, particularly the end closure plates 8 and 9, be made of the same material as the body, or of a material compatible therewith for the services and under the conditions herein intended.

The heating coil E is preferably cast into the middle interior of the body B in and adjacent the central, preferably and ordinarily the horizontal, median plane thereof with its essential exothermic strands symmetrically related and largely parallel to the fluid passages P, FIGS. 6 and 7, and intimately embraced by and bonded to and into the metal of the body for efficient transmission of heat to the body and with thermal symmetry for uniform diffusion of heat through and throughout the body to the fluid in the passages. The coil E in a conventional form with a Nicrome or other suitable high resistance conductor supported in ceramic powder within a low carbon steel sheath, lends itself advantageously to the purposes and operation of our invention. The coil E in its exothermic aspect preferably comprises essentially only that part extending between the points 17 and 18, FIG. 6; the conductors 19 shown in heavier outline which join the points 17 and 18 with the terminals 20 and 21 preferably being highly conductive with little or no intended exothermic action or effect whereby to facilitate a desirable and efficient location and arrangement of the exothermic, i.e. essential heat producing, parts of the coil in relation to the fluid passages.

It is among the means of gaining advantages of our invention that the fluid passages P be "cast into" the body for efficient and intimate transfer of heat from metal to fluid, that the passages be straight and open at both ends for inspection and cleaning, that they be proximate, and symmetrically related to, the heating coil and interposed between the coil and the exterior of the body and on both sides of the coil whereby to intercept the flow of heat therefrom and tend to be uniformly heated throughout substantially the whole length and from all sides of all the passages, see FIGS. 2–9. In this form of our invention we prefer that the paint to be heated enter each body B at the port 13, FIGS. 3, 4 and 8, and then flow through all the passages P in series, traversing the block back and forth from end to end, first in the horizontal plane above the heating coil, then downwardly as at 22, FIG. 5, and then in the horizontal plane below the coil until the fluid is discharged through the outlet port 14, FIGS. 2 and 8. The series circuit gives maximum velocity and turbulence per unit of length of passage with advantageous heat transfer and minimum stratification, separation and sedimentation. The level, horizontal disposition of the upper and lower groups of passages P with the only departure from level flow being downwardly at the ports 13 and 14 and from the upper to the lower group of passages as at 22, avoids traps, pockets, low spots and other invitations to sedimentation or deleterious separation out of entrained constituent parts of the paint. Making the passages P straight and of substantially uniform diameter serves the same advantage, avoids local overheating due to stratification and avoids separation of fluid constituents at places of reduced or deleteriously changing velocity, and lends itself to die casting.

In this form of our invention we give additional impetus and support to the thesis and advantage of maintaining the uniform thermal and mechanical homogeneous consistency of the paint or other heated fluid and the further prevention of deleterious separation and sedimentation by inducing beneficent turbulence in the fluid stream at each end of the body where the direction of travel of the fluid stream is reversed as at the places 23, FIGS. 2, 3, 5 and 9 which, with the similarly formed place 22, FIG. 5, are made to be zones of turbulent flow created by the abrupt changes in direction and the flat faces of the closure plates disposed at sharp right angles to the axes and walls of the passages P, see FIG. 9.

Figure 3:
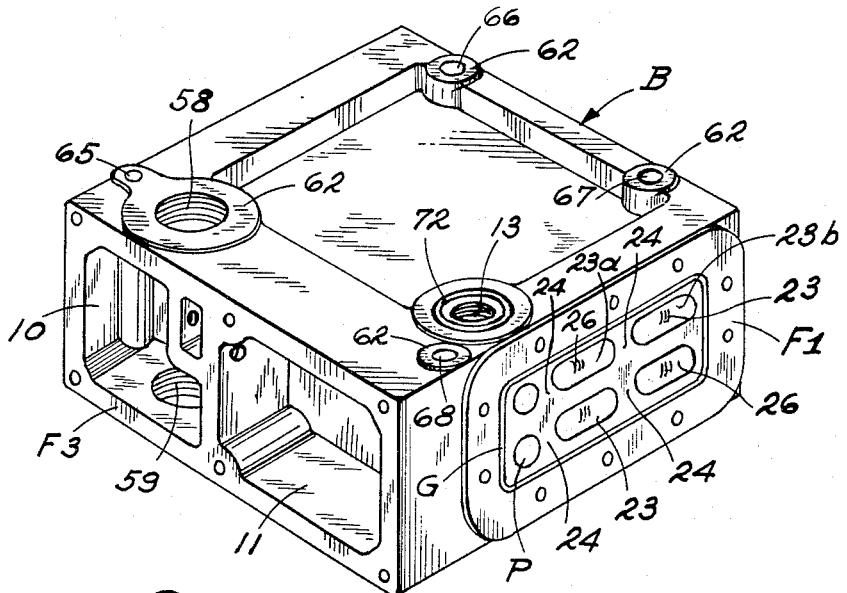
FIGURE 3 is an isometric view from the top looking down at the same or a like body of our heater element.

Specifically, as best shown in FIGS. 2, 3, 5 and 9, the passages P in each horizontal group, viewed as shown, are separated by partitions 24 and 25 (comprising integral parts of the cast body) which partitions, however, are not quite as long as the passages P and are alternately arranged so that alternate partitions extend fully to one end of the body and fall short of the other end as at 26, see FIGS. 2, 3 and 9. That is to say, the partitions 24 all extend fully to the "in and out" end of the body, FIGS. 2, 3 and 9, where they contact the end plate 8, whereas the partitions 25 are all spaced from the end plate 8 at the "in and out" end of the body as at 26, FIG. 9, to provide a return bend for the fluid to flow from one passage to the next adjacent passage. The alternate and opposite condition prevails at the "return" end of the body, see FIG. 5, where alternately arranged return bends and zones of turbulence corresponding to the zones 23 are provided. Additionally, at the return end of the body, an up and down return bend and turbulent zone is provided at 22, FIG. 5; the central core 27, FIG. 8, of the body which embraces the heating coil serving as the shortened partition between the passages P28 and P29 at the rear of the body, FIG. 5. Fluid entering the port 13 will travel leftwardly as viewed in FIGS. 2, 3 and 8 in the passage P15 to the turbulent return zone adjacent the closure plate 9, will return through the next adjacent passage P, see FIG. 5, to the rightward or near end of the body to the return zone of turbulence specifically designated 23a in FIGS. 2 and 3, thence leftwardly and rightwardly in the next pair of passages as viewed in FIG. 5 back to the return zone of turbulence specifically designated 23b, FIGS. 2 and 3, thence leftwardly again through the upper rear passage P28, thence downwardly in the vertically disposed zone of turbulence 22, FIG. 5, and then rightwardly in the lower rearward passage P29, and then leftwardly and rightwardly in the lower group of passages P, see also FIG. 9, and finally through the passage P16, FIGS. 5 and 8 to the discharge port 14. The turbulent action at each of the turbulent return zones is suggested by the arrows a, b, c, d, e and f, FIG. 9; the particulars of desirably confused turbulent flow being too vigorous to more than suggest by the divergent and apparently contradictory arrows. The turbulence, mixing and remixing of the paint tends to (1) minimize the differences between the hottest and coolest drops or molecules of paint that are intended to be raised to the same temperature, (2) avoid excessive localized temperatures which, as in catalyzed materials, could convert or begin to convert the overheated parts prematurely and deleteriously, and (3) re-entrain parts of the paint which might otherwise tend to lag or separate out. These effects offset the opposite tendencies in the flow through the straight and relatively large, low-friction passages P and let us preserve the other advantages thereof.

With ten passages P, each about ¾" in diameter and about 9" long and disposed as suggested in the drawings, it is practicable to raise the temperature of most organic finishes of present common use from room temperature up to about 170° F. with the electric heating coil E of about 2000 watts capacity and operating approximately full time while the single element heater H is supplying paint to one or more guns spraying paint at the rate of about 12 gallons per hour. At this rate, the mean velocity of paint flowing through the passages P, connected in series as hereinabove described, will be about 3.75 feet per minute; an average speed which provides beneficent turbulent remixing of the paint in the zones of turbulence mentioned above. Normal operation includes, however, the not unusual condition of intermittent spraying and of recirculation of heated paint through the guns, hoses and heaters which may double the mean flow and velocity of paint movement in the passages, as to about 7.0 feet per minute. And intermittent operation may normally comprehend alternate short periods of relative quiescence of the paint in the passages and then periods of relatively rapid flow which may give more beneficent turbulence with faster thermal mixing and heat transfer with paint flowing at the instantaneous velocity of about 10 feet per minute in a single heating element installation. When single heating elements H are combined into units U as in FIG. 1, with all the fluid passages P connected in series, the velocities will be increased at least proportionately; a three element unit having a capacity of 36 gal. per hour with about 100° F. rise in paint temperature, will have its flow velocities, for the conditions mentioned above, tending to increase threefold. Lesser desired increases in temperature per gallon per hour will also admit of inversely corresponding higher rates of flow of paint in the passages and more vigorous action in the zones of turbulent mixing.

As suggested in FIG. 9 the point 26 at the "short" end of the partition in the turbulent return zone is preferably disposed about as far from the proximate surface of the closure plate as the diameter of the passage P. It is within our teaching, however, that this dimension may be reduced moderately down to approximately half the diameter of the adjacent passages P wherewith to enhance the turbulence and remixing at the return zones should the paint or fluid intended to be heated have a greater than usual need for remixing or a higher burden of entrained material which would otherwise tend to settle out or become separated from the fluid stream disadvantageously.

The face F1 of the near end of the body B, FIGS. 2, 3, 8 and 9 and the face F2 of the far end of the body B, FIG. 5, adjacent to, between and surrounding the ends of the passages P and the return zones, are formed substantially smooth and planar wherewith to have intimate contact with the smooth planar inner faces of the end closure plates 8 and 9 respectively, tending to inhibit the flow or escape of paint or fluid from one passage to another except in the intended paths described above; the tendency for this leakage being relatively small because of the small pressure differences between the different passages. Since, however, the paint in all the passages is often contemplated to be as much as 1000 pounds per square inch higher than atmospheric, a fluid-tight seal is provided against loss of paint between the closure plates 8 and 9 and the faces F1 and F2 in the form of an O-ring R in each continuous groove G closely surrounding the areas defined by the ends of the passages P, see FIGS. 8 and 9. A plurality of peripherally arranged cap screws S, FIGS. 1 and 4 for example, urge the closure plates to tight contact with the faces F1 and F2 and into fluid-tight engagement with the O-ring seal.

Turning now more particularly to the electrical and heating controls, and the explosion proof precautions therefor:

As mentioned above, explosion proof chambers 10 and 11 are provided within the front part of the body of each of the primary heaters H, FIGS. 2, 3 and 10; the forward peripheral face F3 being substantially planar across the whole forward end of the body and having smooth, close, intimate flame-quenching contact with the inner, smooth, substantially planar peripheral face of the front closure plate 12 to provide the not literally fluid-tight but wide intimate face to face thin, flame-cooling and flame-quenching contact according to the Fire Underwriter's specifications for this kind of closure of explosion proof chambers.

As shown above with reference to FIG. 6, the electrical terminals 20 and 21 for the heating coil E protrude from the casting of the body into the chamber 11, and, as shown in FIG. 10, are connected with the electrical power leads 31 and 32 which reach into the junction box 10 through an "on" and "off" switch 33 in the lead 31 and through both a safety fusable plug 34 and an adjustable thermostatically controlled switch 35 in the lead 32. For enhanced explosion proof safety, the leads 31 and 32 both pass through a small sealing chamber 36 with a prescribed conventional explosion proof seal for and surrounding the parts of the leads contained therein.

The thermostat for the switch 35 comprises a bimetallic element secured close to and in intimate contact with the main casting of the body at about the place 37 as viewed in FIG. 6; i.e., closely adjacent the lower part of the inner wall of the chamber 11, so that the thermostat reflects and responds to approximately the maximum temperature of the main heat transferring part of the body B adjacent the pasage P16 near the outlet port 14 and near the "bulb" of the thermometer 57, where the paint tends to approach or equal the temperature of the metallic mass of the body. The thermostat has an adjusting screw 38 with a slotted head which is receptive of the blade 39, FIGS. 13 and 14, of the rotatable control shaft 40 that extends through the cover plate 12 and is rotatable in threaded engagement with the cover plate and is externally accessible as shown in FIG. 11. Conveniently, the exposed end of the shaft 40 may also be slotted as shown in FIG. 11 whereby to be rotated with a coin or a screwdriver, and may have a pointer 41 related to numerals on a dial as shown in FIG. 11 to reflect the angular position of adjustment of the thermostat adjusting screw 38. A swingable cover plate 42 may cover the exposed end of the control shaft 40 as shown in FIG. 1 between periods of adjustment and prevent inadvertent adjustments or disturbances thereof. To obviate binding between the control shaft 40 and the adjusting screw 38, the blade 39, see FIG. 14, may prudently be carried on a laterally movable element 43, slideable radially on a transverse pin 44 carried by the shaft 40.

The "on and off" switch 33 comprises a pair of contacts that are carried respectively on the adjacent ends of conducting arms, the upper of which is resiliently biased to hold the contacts apart (preferably rather more fully than shown in FIG. 10) to maintain the heating circuit open until the upper arm and contact is forced down to close the contacts by rotation of the cam 50, FIGS. 13 and 14. The cam 50 is carried on the inner end of the shaft 51 which extends through the cover plate 12 in threaded engagement with the cover plate and is rotatable through a quadrant by the externally disposed knob 52, FIGS. 11 and 13. Appropriate stops and indicia on the cover plate marked "on" and "off" guide the twister of the knob 52 to move the cam 50 to and from the positions wherewith it closes the switch 33 or opens it as may be desired. On the interior side of the cover plate 12, the shaft 51 preferably has a square shank, not specifically shown, which, however, is engageable on opposite sides by the spring clip 53, FIGS. 13 and 14, whereby to yieldably secure the switch 33 in its "on" and "off" positions respectively.

Shunted across the terminals 20 and 21 is a lamp 55, FIG. 10, which is externally visible through the explosion proof window 56, FIGS. 1, 11 and 12, to provide visible indication of the energization of the heating coil E. The behavior of this light is informative. A flickering light may betray a shaking or vibrating support for the heater or an injured or impaired bimetal element that may tend to burn the contact points of the thermostat. With the heater clean and in good order, the "on" and "off" time of the light will reveal how fully or meagerly the heater is being used at the then selected paint temperature and rate of consumption, and will suggest the practicability of employing more or less paint guns per heater, or of modifying the paint temperature, or of combining more heating elements H to heat more paint or vice versa, all as our invention happily accommodates and provides.

A thermometer 57, FIGS. 1, 8 and 10, is carried by the near end closure plate 8 with its "bulb' or heat sensitive part disposed in the passage P16 near the outlet 14 whereby to reveal the temperature to which the paint or fluid has been raised in the element H at about the place and/or moment of its delivery therefrom. When an element H is to be used alone, suitable pipe fittings 45 and 46, FIG. 10, may threadably engage the ports 13 and 14 and afford connection with appropriate high pressure hoses or pipes leading paint to and from the heater.

The junction box 10 is provided with upper and lower threaded holes 58 and 59, FIGS. 2, 3, 4 and 7, each having a sufficient number of turns of female threads to be explosion proof when and as in coaction with a male threaded member, such as a closure plug 60 and/or an electrical conduit fitting 61, FIG. 1.

The multiple element, unit heater U, FIGS. 1, 2, 3 and 4:

As suggested above, our invention also contemplates that each of the heating elements H be formed and constructed to be combined and coact with one or more like elements to make a heating unit of correspondingly greater capacity, preserving and enhancing the utilities and advantages of the primary elements and the safety, control and facility thereof. As shown in FIGS. 1–3 any desired plurality of elements H may be stacked and combined, preferably one above the other with uppermost, separate, smooth co-planar top surfaces 62, FIGS. 3 and 4, of a lower element closely engaging corresponding lowermost, separate, smooth, complementary co-planar bottom surfaces 63, FIG. 2, of an upper element as in a common horizontal plane Z, FIG. 1. (We do not disclaim the combination of elements H with their co-planar surfaces meeting in vertical or other non-horizontal planes, but we prefer to preserve the continuous down-flow principle of horizontal disposition in the multiple unit heater for the enhanced advantage thereof.) All the several surfaces 62 of each heater element H lie in the same plane which is raised a little above the other upper surfaces of the element, see also FIG. 1, and all the several surfaces 63 of each element lie in the same plane which is a bit lower than the other lower surfaces of the element and is parallel to the plane of the surfaces 62 and at right angles to the faces F1, F2 and F3. When one element H is placed upon another as in FIG. 1, the elements bear upon each other exclusively on the surfaces 62 and 63, regard being had for the fluid seal between the surfaces 62 and 63 adjacent the paint inlet and outlet ports 13 and 14 of combined elements, FIG. 8, to be described below.

FIGS. 3, 4 and 7 reveal that one of the smooth co-planar surfaces 62 surrounds the threaded upper opening 58 of the conduit box 10 as well as the bolt hole 65 through which one of the four tie bolts 64 passes, FIG. 1; four tie bolts clamping and securing the whole stack of element H together in the operative unit U. A coaxially aligned surface 63 surrounds the lower threaded opening 59 of the conduit box 10 as well as the lower end of the bolt hole 65, FIGS. 2 and 7. These planar surfaces around these openings of the conduit box 10 are of width and character such that when they are in mutual contact in a stacked unit, as in the left middle of FIG. 1, they will have the cooling, flame-quenching quality of closures for an explosion proof chamber so that the explosion proof quality of each junction box 10 of each element H is preserved in the multiplication of explosion proof junction boxes in the unit U while all the junction boxes of all the elements are, in fact, united into a common explosion proof box and/or chamber extending from the bottom closure plug 60 up to and including the external conduit 61A in which the external power leads are disposed, and from which the external leads may pass to and through each junction box 10 of each element and be joined with the internal leads 31 and 32 of each element in its respective junction box.

Three others of the upper and lower co-planar surfaces 62 and 63 may surround the upper and lower ends respectively of the bolt holes 66, 67 and 68, see also FIGS. 4, 6 and 7, for the three others of the tie bolts 34, whereby with all the holes 65–68 having their axes normal to the planes 62 and 63 and the bolts 34 having free sliding fits in the holes, tension in the bolts will align and secure the several elements H, all in true, firm and square alignment with each other with, inter alia, the ports 13 and 14 in juxtaposed elements coaxially aligned. As suggested in FIG. 1, nuts 69 engage the upper ends of the bolts 34 to tighten the same, and sleeve spacers 70 between the bolt heads and adjacent surfaces 63, raise the bottom of the lower element H above any flat supporting surface upon which the heads of the bolts 34 may bear, and thus support the heating unit with convenient access to the bottom thereof and room for the junction box closure plug 60 and for the pipe elbow 71 through which heated paint is delivered.

It will now appear that with the paint ports 13 and 14 in each element coaxially aligned as we provide, FIGS. 2, 3 and 7, that the inlet port of each lower element will be coaxially aligned with the discharge port of each upper element when the multiple unit is assembled, and that the adjacent planar surfaces 62 and 63 in the unit will be in smooth flat tight contact with each other when the tie bolts are tensioned to integrate the several elements into the unit. In each of the upper surfaces 62 adjacent the ports 13 of all of the elements H in a unitary heater U, we provide an annular groove 72, FIGS. 3 and 7, and in all but the topmost exposed surface 62, the groove 72 has an O ring seal, not shown, which however contacts the superposed surface 63 of an upper element and is appropriately compressed in the groove to seal the hot, high pressure paint or other fluid from leakage between elements in the unit. An elbow pipe fitting 73, FIG. 1, connects the uppermost inlet port 13 with the external source of paint to be heated, vis-a-vis the lower elbow 71 through which the heated paint is conducted away from the heater as to the hoses and guns through which it is expelled and consumed. Arrows adjacent the elbows show the entrance to and exit of the downflowing paint to and from the assembled multiple unit as we prefer. In a multiple unit a single thermometer 57 in the lower element will indicate the discharge temperature of the heated paint. Thermometers in each element of a unit, not shown in FIG. 1, will betray the temperature gradient from one element to another and, inter alia, may usefully discover the relative efficiencies, loads and thermal adjustments of the several elements in relation to each other.

In the operation of the unit U with the fluid connections properly made and the pumps, guns and paint circuits prudently established to take advantage of the work of the heater, cold or relatively cool paint will be introduced at the upper fitting 73 and caused to follow the continuous down-flow, trap-free, pocket-free path through the horizontally disposed passages P and downwardly in the connecting ports 13 to 14 from each upper to each adjacent lower element, and downwardly in the vertically disposed return bends 22 in each element, and finally downwardly and outwardly at the discharge elbow 71. Such fluid movement will attend the consumption and spraying of hot paint, or in the first instance, or while spraying is in abeyance, may also attend recirculation of paint through the heater to maintain a desired temperature of paint and to preserve the desired homogeneity, even distribution, entrainment or re-entrainment and mixture of the constituents thereof.

In all events, when heating of paint is sought and called for, any one or more of the elements H may be separately and selectively energized by its separate control knob 52 and given its any desired share of the heating load by separate and selective adjustment of its own thermostat by rotation of its thermostat adjusting screw 38. With a minimum load on a multiple heater, the lower element only, for example, may be energized and controlled, and as the load is increased, additional elements may be energized until all the elements are employed at maximum capacity whereby to use and prove the full heating capacity of the whole unit.

The whole unit and all its constituent heating elements will be preserved safe and explosion proof while the units are being turned "on" and "off," while the thermostats are opening and closing their switches 35 and while the thermostats are being adjusted, all by reason of the explosion proof construction above described and the explosion proof disposition of the control shafts through the front cover plate and the safe access to the controls from the exterior side of the plate.

The multiple unit U preserves the virtue of cleanability inherent in each of the elements. At any time, preferably in the absence of high fluid pressure in the passages P, any of the closure plates 8 or 9 may be removed to expose the adjacent passages and turbulent return zones for inspection and cleaning without otherwise disturbing the unit. Another advantage peculiar to our multiple element, unit heater is that by arranging all the passages P in series, the greater the capacity and the greater the load, the higher will be the velocity of paint through the passages and through the zones of turbulent remixing and, therefore, better heat transfer and better remixing and entrainment of separable constituents will be enjoyed.

The operation of any of the primary heating elements H taken alone, has been emphasized in relation to the element being positioned with the heating coil and the passages P disposed in horizontal planes, as we prefer, for the reasons enlarged upon above. The elements H are, however, useful paint heaters when placed and used in other positions; the departure from entire absence of upflow corresponding to the departure from the preferred horizontal position. Apart from this relative disadvantage, our single element heaters enjoy and retain all the other advantages and utilities of our invention even when put to the relative disadvantage of being caused to lie in a less than preferred position.

While we have illustrated and described a preferred form and embodiment of our invention, changes and improvements therein will occur to those skilled in the art who come to understand and enjoy the teachings hereof and the advantages thereof without departing from the spirit and substance of our invention. Therefore, we do not want to be limited in the scope and effect of our patent to the preferred form of our invention here specifically illustrated and described, nor in any other way inconsistent with the progress by which the art has been promoted by our invention.

We claim:

1. A paint heater comprising in combination a plurality of detachable primary paint heating elements interconnected to have a continuous fluid passage from top to bottom when the several elements are stacked one above another, each element comprising a solid body of heat conducting material having fluid passages for paint and having an electrical heating coil near said passages, means connecting said passages, electrical conducting means connected to said coil, each of said elements having an explosion proof chamber with openings for said conducting means aligned about a vertical axis when said elements are stacked vertically, said heating coil having terminals disposed in said explosion-proof chamber and connected to said electrical conducting means therein, and said bodies providing smooth planar surfaces around said openings externally thereof for explosion proof engagement with like surfaces of adjacent elements in said heater, each of said elements also having coaxially aligned fluid inlet and outlet ports around which each of said bodies also provides smooth planar surfaces normal to the axis of said ports and lying in the same planes as the planes of said explosion proof surfaces, and means for holding said elements in engagement with each other on the plane of said planar surfaces.

2. The combination of claim 1 wherein the explosion proof chambers of all of said elements comprise a single common explosion proof chamber for the entire heater, and electrical leads for all of said elements extending through said common chamber.

3. The combination of claim 1 with separate electrical control means in each of said chambers for each of said electrical heating coils in each of said elements, separate removable cover plates for each of said chambers, and means having explosion proof passage through each of said cover plates for actuating said control means.

4. The combination of claim 1 in which each of said chambers has an internal partition and a cover plate dividing said chambers into an explosion proof junction box embracing said openings and an explosion proof switch containing box separated from said junction box by said partition, each of said cover plates having an explosion proof window exposing the interior of said switch containing box and a lamp in each of said switch containing boxes indicating an electrical condition of the heating coil in each of said elements.

5. A paint heater comprising in combination a plurality of detachable primary paint heating elements interconnected to have a continuous fluid passage from top to bottom when the several elements are stacked one above another, each element comprising a solid body of heat conducting material having fluid passages connected together to form a continuous passage for paint and having an electrical heating coil near said passages, electrical conducting means connected to said coil, each of said elements having an explosion proof chamber with openings for said electrical conducting means aligned about a vertical axis when said elements are stacked vertically, said heating coil having terminals disposed in said explosion proof chamber and connected to said electrical conducting means therein, said bodies providing smooth planar surfaces around said openings externally thereof for explosion proof engagement with like surfaces of adjacent elements in said heater, each of said elements also having coaxially aligned fluid inlet and outlet ports around which each of said bodies also provides in each of said elements smooth planar surfaces normal to the axis of said ports and lying in the same planes as the planes of said explosion proof surfaces, each of said planar surfaces adjacent an inlet port having an annular groove and having a seal in said groove coacting with the planar surface adjacent an outlet port of an element superimposed thereupon in said heater, each of said elements having a plurality of tie bolt holes with their axes parallel to the axes of said ports and apertures and spaced therefrom, and the said bodies all having smooth planar surfaces in the said planes of the said planar surfaces at the ends of said tie bolt holes, and tie bolts in said holes compressing said elements together in tight contact on said co-planar surfaces and forming a continuous explosion proof chamber throughout the height of said unit.

6. A paint heater comprising a solid body of heat conducting material having upper and lower groups of straight rectilinear paint conducting passages cast into the body, and comprising means connecting said passages for the continuous passage of paint, said body also having heating means cast in the body between said groups of passages in thermal communication with said passages, and having axially aligned inlet and outlet ports communicating respectively with said paint conducting passages on opposite sides of said heating means, electrical conducting means connected to said heating means, said heating means comprising an electrical device, said ports having a common axis normal to the direction of said passages, said body also having smooth, substantially planar external surfaces surrounding said ports respectively and engageable with like surfaces of like bodies when combined therewith, and fluid sealing means associated with said surfaces, and said body having an explosion proof chamber cast therein between external faces of the body which lie normal to the said axis of said ports, said chamber having coaxial apertures for said electrical conducting means, aligned on an axis normal to said external faces and parallel to the said axis of said ports and spaced therefrom in said body, said electrical device having terminals disposed in said explosion proof chamber and connected to said electrical conducting means therein, said body also having substantially planar external surfaces surrounding said apertures lying in the same planes respectively as the planes of said external surfaces surrounding said ports for explosion proof engagement with like surfaces in like bodies when combined therewith.

7. The heater of claim 6 in which said body also has a plurality of holes for tie bolts with axes parallel to the axes of said ports and said apertures and spaced from each other, and has external smooth, substantially planar surfaces adjacent the ends of said holes in the same planes respectively as the said external surfaces for engagement with like surfaces in like bodies when combined therewith.

8. The combination of a plurality of the said heaters of claim 7 engaging each other on the said smooth coplanar surfaces, and tie bolts disposed in said holes and holding said bodies in stressed engagement with each other.

9. A paint heater comprising a body of heat conducting material having paint conducting passages in the body interconnected for paint to flow therethrough, and having heating means in the body in thermal communication with said passages, electrical conducting means connected to said heating means, said heating means comprising an electrical device, said body having axially aligned inlet and outlet ports communicating respectively with said passages on opposite sides of said body, said body also having substantially planar external surfaces surrounding said ports respectively and engageable with like surfaces of like bodies when combined therewith, and fluid sealing means associated with said surfaces, said body having an explosion proof chamber formed therein between external faces of the body which lie normal to the said axis of said ports, said chamber having coaxial apertures for said electrical conducting means aligned on an axis normal to said external faces and parallel to the said axis of said ports and spaced therefrom in said body, said electrical device having terminals disposed in said explosion proof chamber and connected to said electrical conducting means therein, said body also having substantially planar external surfaces surrounding said apertures lying in the same planes respectively as the planes of said external surfaces surrounding said ports for explosion proof engagement with like surfaces in like bodies when combined therewith.

10. A paint heater comprising a body of heat conducting material having interconnected paint conducting passages and heating means adjacent thereto and also comprising electrical means therein, said body having inlet and outlet ports on upper and lower sides thereof communicating respectively with said passages, said body having smooth external surfaces on said sides of said body surrounding said ports respectively and engageable with like surfaces of like bodies when combined therewith, and said body having an explosion proof chamber for said electrical means between said sides of said body, said chamber having apertures in said sides spaced from said ports, and said body also having smooth external surfaces surrounding said apertures lying in the same planes respectively as the planes of said external surfaces surrounding said ports for explosion proof engagement with like surfaces in like bodies when combined therewith.

11. A paint heater comprising a solid body of heat conducting material having straight rectilinear paint conducting passages cast into the body and connected together to form a continuous passage, and having inlet and outlet ports connected to said passages, and having heating means cast in the body in thermal communication with said passages, said heating means being electrical, and said body having an explosion proof chamber cast therein with coaxial apertures opening from said chamber to the exterior of said body, said body also having planar external surfaces surrounding said apertures for explosion proof engagement with like bodies when combined therewith.

12. A paint heater comprising a body of heat conducting material having interconnected paint conducting passages and heating means adjacent thereto and also having electrical means in the body and having inlet and outlet connections communicating with said passages, said body having an explosion proof chamber cast therein for said electrical means with apertures opening from said chamber to the exterior of said body, said body also having planar external surfaces surrounding said apertures for explosion proof engagement with like bodies when combined therewith.

13. The heater of claim 12 with external ports for said connections, said body also having planar external surfaces surrounding said ports in the same planes as the said surfaces surounding said apertures and spaced therefrom and engageable with like surfaces of like bodies when combined therewith.

14. A paint heater comprising a body of heat conducting material having interconnected paint conducting passages and heating means adjacent thereto and also having electrical means in the body and having inlet and outlet connections communicating with said passages, said body having an explosion proof chamber for said electrical means with apertures opening from said chamber to the exterior of said body, said body also having planar external surfaces surrounding said apertures for explosion proof engagement with like bodies when combined therewith, and said body also having other external bearing areas in the same planes as said planar surfaces wherewith to align said planar surfaces for full explosion proof engagement with corresponding surfaces in like bodies when combined therewith.

15. A heater for liquids comprising a body of heat conducting material having upper and lower groups of straight, open-ended, liquid passages therein, heating means comprising a heating coil in the interior of said body, detachable means for removably enclosing the open ends of said passages and guiding the flow of fluid through said heater, means for controlling the heat output of said heating coil, said body having substantially planar end faces at the ends of said passages, said detachable means comprising closure plates with substantially planar surfaces engaging said end faces, a fluid seal surrounding the said ends of said passages between said faces and said surfaces, said body also comprising partitions between said passages, alternate ends of which partitions are spaced from said surfaces and form return zones connecting adjacent passages in series, said body having axially aligned inlet and outlet ports for said liquid with a common axis normal to the planes of the axes of said passages and communicating respectively with liquid passages on opposite sides of said heating coil, and having smooth, substantially planar external surfaces on said body surrounding said ports respectively and engageable with like surfaces of like bodies when combined therewith, and fluid sealing means associated with said surfaces.

16. A paint heater element comprising a body of heat conducting material having a pair of vertically spaced groups of paint conducting passages, each group comprising a plurality of spaced parallel, rectilinear, horizontal passages open at both ends and connectable in pairs at alternate ends in series, and the groups being connectable in series in a vertical downflowing passage at the vertically adjacent ends of a pair of passages, one from each group, and said element also comprising means for so connecting said passages and said groups, and said body also having heating means disposed between groups of passages and in thermal communication therewith, said element having axially aligned inlet and outlet ports communicating respectively with said groups on opposite sides of said heating means and having a common vertical axis removed from said vertical downflowing passage, said element having smooth, substantially planar, external sealing surfaces on said body normal to said vertical axis and surrounding said ports respectively and engageable with like surfaces of like bodies when combined therewith, fluid sealing means associated with said surfaces, and bearing surfaces in the respective planes of said sealing surfaces and spaced therefrom.

17. A paint heater element comprising a body of heat conducting material having a pair of vertically spaced groups of paint conducting passages, each group comprising a plurality of spaced parallel, rectilinear, horizontal passages in the same plane and open at both ends and connectable in pairs at alternate ends in series, and the groups being connectable in series in a vertical downflowing passage at the vertically adjacent ends of one pair of passages, one from each group, and said element also comprising means for so connecting said passages and said groups, said body having heating means disposed between groups of passages and in thermal communication therewith, said body also having internally extending, outwardly opening, axially aligned, inlet and outlet ports communicating respectively with vertically adjacent ends of another, remote and different pair of passages, one from each group, on opposite sides of said heating means and having a common vertical axis removed from said vertical downflowing passage by the whole length of all the passages in each group, said element having smooth, substantially planar external sealing surfaces on said body normal to said vertical axis and surrounding said ports respectively and engageable with like surfaces of like bodies when combined therewith, fluid sealing means associated with said surfaces, and bearing surfaces in the respective planes of said sealing surfaces and spaced therefrom.

18. A paint heater element comprising a body of heat conducting material having vertically spaced groups of interconnected paint conducting passages connected by a vertical downflowing passage at the vertically adjacent ends of certain passages, said body having heating means disposed between groups of passages and in thermal communication therewith, said body also having internally extending, outwardly opening, axially aligned, inlet and outlet ports communicating respectively with vertically adjacent ends of other remote and different passages on opposite sides of said body and having a common vertical axis removed from said vertical downflowing passage, said element having smooth, substantially planar external sealing surfaces on said body normal to said vertical axis and surrounding said ports respectively and engageable with like surfaces of like bodies when combined therewith, fluid sealing means associated with said surfaces, and bearing surfaces in the respective planes of said sealing surfaces and spaced therefrom.

References Cited by the Examiner

UNITED STATES PATENTS

| | | | |
|---|---|---|---|
| 1,288,069 | 12/18 | Longoria | 219—298 X |
| 1,737,347 | 11/29 | Wilson. | |
| 1,766,068 | 6/30 | De Lannoy | 219—305 |
| 1,799,626 | 4/31 | Keith. | |
| 1,985,830 | 12/34 | Hynes | 219—305 |
| 2,013,186 | 9/35 | Price | 165—167 |
| 2,499,448 | 3/50 | Axelson. | |
| 2,529,215 | 11/50 | Hicke | 219—540 X |
| 2,673,919 | 3/54 | Arvins et al. | 219—302 |

RICHARD M. WOOD, *Primary Examiner.*

ANTHONY BARTIS, *Examiner.*